United States Patent
Mangnall et al.

(10) Patent No.: US 11,106,432 B2
(45) Date of Patent: Aug. 31, 2021

(54) EXECUTION UNIT IN PROCESSOR

(71) Applicant: Graphcore Limited, Bristol (GB)

(72) Inventors: Jonathan Mangnall, Portishead (GB); Stephen Felix, Bristol (GB)

(73) Assignee: Graphcore Limited, Bristol (GB)

( * ) Notice: Subject to any disclaimer, the term of this patent is extended or adjusted under 35 U.S.C. 154(b) by 7 days.

(21) Appl. No.: 16/427,794

(22) Filed: May 31, 2019

(65) Prior Publication Data

US 2020/0293315 A1 Sep. 17, 2020

(30) Foreign Application Priority Data

Mar. 11, 2019 (GB) ...................................... 1903347

(51) Int. Cl.
*G06F 7/556* (2006.01)
*G06F 9/30* (2018.01)
*G06F 7/483* (2006.01)
*G06N 3/063* (2006.01)

(52) U.S. Cl.
CPC .............. *G06F 7/556* (2013.01); *G06F 7/483* (2013.01); *G06F 9/3001* (2013.01); *G06N 3/063* (2013.01)

(58) Field of Classification Search
CPC ......... G06F 7/556; G06F 7/483; G06F 7/4876
See application file for complete search history.

(56) References Cited

U.S. PATENT DOCUMENTS

| 5,926,406 | A | 7/1999 | Tucker et al. | |
|---|---|---|---|---|
| 6,202,148 | B1 * | 3/2001 | McCanny | G06F 7/762 712/229 |
| 6,256,653 | B1 * | 7/2001 | Juffa | G06F 7/483 708/290 |
| 6,910,059 | B2 * | 6/2005 | Lu | G06F 1/0356 708/277 |

(Continued)

FOREIGN PATENT DOCUMENTS

EP 3379407 A1 * 9/2018 ............. G06F 7/556

OTHER PUBLICATIONS

Jeong, IEEE Transactions on Computers, vol. 53, No. 4, pp. 489-495, 2004, "A Cost-Effective Pipeline Divider with a Small Lookup Table", Apr. 2004.

(Continued)

*Primary Examiner* — Aimee Li
*Assistant Examiner* — Carlo Waje
(74) *Attorney, Agent, or Firm* — Haynes and Boone, LLP

(57) ABSTRACT

An execution unit is described which is particularly configured to generate an exponential of an operand floating point format. The operand is multiplied by a fixed multiplicand, logged to the base 2 (e) to generate a multiplication result. An integer part and a fractional part are extracted from the multiplication result. An exponent register stores the integer part to form the exponent of the exponential result. A lookup table has a plurality of entries each providing a value of $2^f$ for a fractional part f used to access a lookup table. The fractional part is derived from a mantissa of the operand.

(Continued)

That is, first and second bit sequences are extracted from the mantissa. One of the bit sequences is used to generate an estimated fractional component, and the other is used to access a value from the lookup table.

18 Claims, 8 Drawing Sheets

(56) References Cited

U.S. PATENT DOCUMENTS

| | | | |
|---|---|---|---|
| 9,128,790 B2* | 9/2015 | Azadet | G06F 7/556 |
| 10,713,013 B1* | 7/2020 | Old | G06F 7/556 |
| 2009/0037504 A1* | 2/2009 | Hussain | G06F 1/0307 |
| | | | 708/277 |
| 2010/0198894 A1 | 8/2010 | Azadet | |
| 2020/0319851 A1* | 10/2020 | Rhisheekesan | G06F 7/4873 |
| 2020/0394019 A1* | 12/2020 | Viswanathan Pillai | |
| | | | G06F 7/548 |

OTHER PUBLICATIONS

Combined Search and Examination Report for GB Patent Application No. GB1903347.1, dated Sep. 17, 2019. 6 pages.

* cited by examiner

EXECUTION UNIT IN PROCESSOR

CROSS-REFERENCE TO RELATED APPLICATIONS

This application claims the priority benefit under 35 U.S.C. § 119 of United Kingdom Patent Application No. 1903347.1, filed Mar. 11, 2019, the entire contents of which are incorporated herein by reference.

TECHNICAL FIELD

The present disclosure relates to an execution unit of a processor. The disclosure relates particularly to a unit configured to determine an exponential function where input values and result values are in a floating point number format

BACKGROUND

In computing, bit sequences of predefined sizes are used to represent numbers. The particular representation of the bit sequence determines how a bit sequence is interpreted.

One form of representation is the floating-point representation, which is often used to approximately represent real numbers. The floating-point representation comprises 3 separate components, i.e. a sign component, a mantissa component, and an exponent component. In the single-precision (i.e. 32-bit) floating point representation according to the IEEE 754 standard, the sign component consists of a single bit, the exponent consists of 8 bits, and the mantissa consists of 23 bits. In the half-precision (i.e. 16-bit) floating-point representation, the sign component consists of a single bit, the mantissa consists of 10 bits, and the exponent consists of 5 bits. In most cases, a number is given from these 3 components by the following formula:

$$(-1)^{signbit} \times I.mantissa \times 2^{exponentbits-offset}$$

The displayed "offset" to the exponent is dependent upon the number of bits used to represent the exponent, which is dependent upon the precision level. In the single-precision representation, the offset is equal to 127. In the half-precision format, the offset is equal to 15.

Here "I" is an implicit bit, which is derived from the exponent. In the case that the exponent bit sequence consists of anything other than all zeros or all ones, the implicit bit is equal to one and the number is known as a "Norm". In this case, the floating point number is given by:

$$(-1)^{signbit} \times 1.mantissa \times 2^{exponentbits-offset}$$

In the case that the exponent bit sequence consists of all zeros, the implicit bit is equal to zero and the number is known as a "denorm". In this case, the floating point number is given by:

$$(-1)^{signbit} \times 0.mantissa \times 2^{exponentbits-offset}$$

The denorms are useful, since they allow smaller numbers to be represented than would otherwise be representable by the limited number of exponent bits.

The other circumstance—in which the exponent bit sequence consists of all ones—may be used to represent special cases, e.g. ±infinity or NaN (not a number). NaN is a numeric data type value representing an undefined or unrepresentable value. The presence of a NaN in the results of a calculation is often taken to signal an exception.

Another form of representation is the integer representation. The integer may be signed, in which case a single bit of the bit sequence is used to represent the sign of the number, with the remaining bits of the bit sequence used to represent the magnitude of the number. Alternatively, the integer may be unsigned, in which all of the bits of the bit sequence are used to represent the magnitude of the number.

The floating point representation may be used to represent numbers in implementations of neural network processing. An implementation of neural networks involves the storage and manipulation of such floating point numbers. Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason, the nodes are often referred to as neurons. They may also be referred to as vertices. The links are sometimes referred to as edges. The network can take input data and certain nodes perform operations on the data. The result of these operations is passed to other nodes. The output of each node is referred to as its activation or node value. Each link is associated with a weight. A weight defines the connectivity between nodes of the neural network. Many different techniques are known by which neural networks are capable of learning, which takes place by altering values of the weights.

FIG. 1 shows an extremely simplified version of one arrangement of nodes in a neural network. This type of arrangement is often used in learning or training and comprises an input layer of nodes, a hidden layer of nodes and an output layer of nodes. In reality, there will be many nodes in each layer, and nowadays there may be more than one layer per section. Each node of the input layer Ni is capable of producing at its output an activation or node value which is generated by carrying out a function on data provided to that node. A vector of node values from the input layer is scaled by a vector of respective weights at the input of each node in the hidden layer, each weight defining the connectivity of that particular node with its connected node in the hidden layer. In practice, networks may have millions of nodes and be connected multi-dimensionally, so the vector is more often a tensor. The weights applied at the inputs of the node Nh are labelled w0 . . . w2. Each node in the input layer is connected at least initially to each node in the hidden layer. Each node in the hidden layer can perform an activation function on the data which is provided to them and can generate similarly an output vector which is supplied to each of the nodes $N_0$ in the output layer $N_0$. Each node weights its incoming data, for example by carrying out the dot product of the input activations of the node and its unique weights for the respective incoming links. It then performs an activation function on the weighted data. The activation function can be for example a sigmoid. See FIG. 1A. The network learns by operating on data input at the input layer, assigning weights to the activations from each node and acting on the data input to each node in the hidden layer (by weighting it and performing the activation function). Thus, the nodes in the hidden layer operate on the weighted data and supply outputs to the nodes in the output layer. Nodes of the output layer may also assign weights. Each weight is characterised by a respective error value. Moreover, each node may be associated with an error condition. The error condition at each node gives a measure of whether the error in the weight of the node falls below a certain level or degree of acceptability. There are different learning approaches, but in each case there is a forward propagation through the network from left to right in FIG. 1, a calculation of overall error, and a backward propagation from right to left in FIG. 1 through the network of the error. In the next cycle, each node takes into account the back-propagated error and produces a revised set of weights. In this way, the network can be trained to perform its desired operation.

Certain well known functions, such as logarithms and exponentials may have applications in neural network processing. A problem with which this present application is concerned is how to provide processing resources, which are configured to generate values for such functions quickly and accurately, and preferably in a manner which optimises the use of processing resources.

SUMMARY

According to one aspect of the present invention there is provided an execution unit for a processor, the execution unit configured to receive from a computer readable instruction an op code defining the nature of the instruction and to access an operand defined by the instruction wherein the op code defines that the instruction generates an exponential of the operand, the operand being a number in floating point format, the execution unit comprising:

at least one multiplier circuit configured to multiply first and second input values and to generate a multiplication result;
control circuitry configured to supply the operand as a first input value and a fixed multiplicand, $\log_2(e)$, as a second input value and to extract an integer part and a fractional part from the multiplication result;
an exponent register for storing the integer part as an exponent of the exponential result;
a look up table having a plurality of entries each of which are accessible by a bit sequence representing a fractional part f to provide a corresponding value of $2^f$;
a preparatory circuit configured to extract at least first and second bit sequences from a mantissa of the operand, to generate an estimated fractional component from at least one of the first and second bit sequences, and to use the or each other of the at least first and second bit sequences to access a $2^f$ value from the look up table;
the control circuit further configured to supply the $2^f$ value as a first input value and the estimated fractional component as a second input value to the at least one multiplier circuit to generate a multiplication result which constitutes the mantissa of the exponential result.

In one embodiment, the floating point format is half precision (FP 16) and first and second bit sequences are extracted from the mantissa of the operand, wherein these are the only bit sequences which are extracted. An estimated fractional component is generated from the first (least significant) bit sequence and the second bit sequence is used to access a value from the look up table.

In another embodiment, the floating point format is single precision (FP 32), and more than first and second bit sequences are extracted from the mantissa of the operand. In one arrangement, four bit sequences are extracted from the mantissa of the operand, and at least two of the four bit sequences are of differing lengths. In some embodiments, the least significant bit sequence of the mantissa has the longest length, but because it is the least significant part, it remains possible to generate an estimated fractional component, for example by calculation.

The execution unit may comprise a plurality of look up tables, each look up table configured to be accessed by one of the second or more bit sequences. The number of entries in each look up table may depend on the significance of the bit sequence which is used to access it. The bit sequence of most significance accesses a look up table which has the longest entries, the length of those entries preferably equalling the precision length of the result. Look up table of lesser orders of significance may have reduced length for their respective entries, because there is no need to hold the leading zeroes which would represent the components of higher order.

In one arrangement, the execution unit comprises three multiplier circuits, first and second of the multiplier circuits being configured to execute a multiplication in the same stage of a pipeline, and a third multiplier circuit arranged to execute a multiplication in a subsequent stage of the pipeline.

While references have been made to single precision and half precision floating point formats, an increase in accuracy and precision may be obtained by performing calculations using an extended mantissa length.

In one arrangement, the execution unit comprises an unpack circuit for separating the mantissa from the exponent of the input floating point number, and a packing circuit for combining the mantissa of the exponential result with the exponent of the exponential result.

The estimate for the fractional component may be generated by multiplying the first bit sequence by ln 2 and incrementing the result by 1. This may be carried out in the preparatory circuit. It may use the multiplier circuits of the execution unit pipeline, or additional or alternative multiplier circuits provided for the purpose.

Another aspect of the present invention provides a method of operating an execution unit in a processor, the execution unit configured to receive from a computer readable instruction an op code defining the nature of the instruction and to access an operand defined by the instruction wherein the op code defines that the instruction provides an exponential of the operand, the operand being a number in floating point format, the method comprising:

supplying to at least one multiplier circuit of the execution unit the operand defined by the instruction and a second input value a fixed multiplicand $\log_2(e)$ to separate a multiplication result;
extracting an integer part and a fractional part from the multiplication result;
storing the integer part in an exponent register;
extracting at least first and second bit sequences from a mantissa of the operand;
generating an estimated fractional component from at least the first bit sequence; and
supplying at least the second bit sequence to a look up table having a plurality of entries each of which are accessible by a bit sequence representing a fractional component f and providing a value of $2^f$; and
supplying the accessed $2^f$ value as a first input value to the at least one multiplier circuit, and the estimated fractional component as a second input value to the at least one multiplier circuit and generating a multiplication result representing the mantissa of the exponential, wherein the integer part stored in the exponent register represents the exponent of the exponential.

For a better understanding of the present invention and to show how the same may be carried into effect reference will now be made by way of example to the following drawings.

DETAILED DESCRIPTION

The present disclosure concerns an execution unit configured to determine an exponential function. The unit comprises a plurality of multipliers that are interconnectable to efficiently operate in a pipelined manner. The following description explains various embodiments of the application in further detail. The techniques described herein can be used with the intelligence processing units (IPUs) described in our earlier U.S. application Ser. No. 15/885,925, the contents of which are herein incorporated by reference. Such an IPU comprises a plurality of tiles 4 (only one of which is shown herein) interconnected by a switching fabric 34 to form a chip. Such chips can be connected together using links on the chip to form a multi-chip processor.

Figure 1:
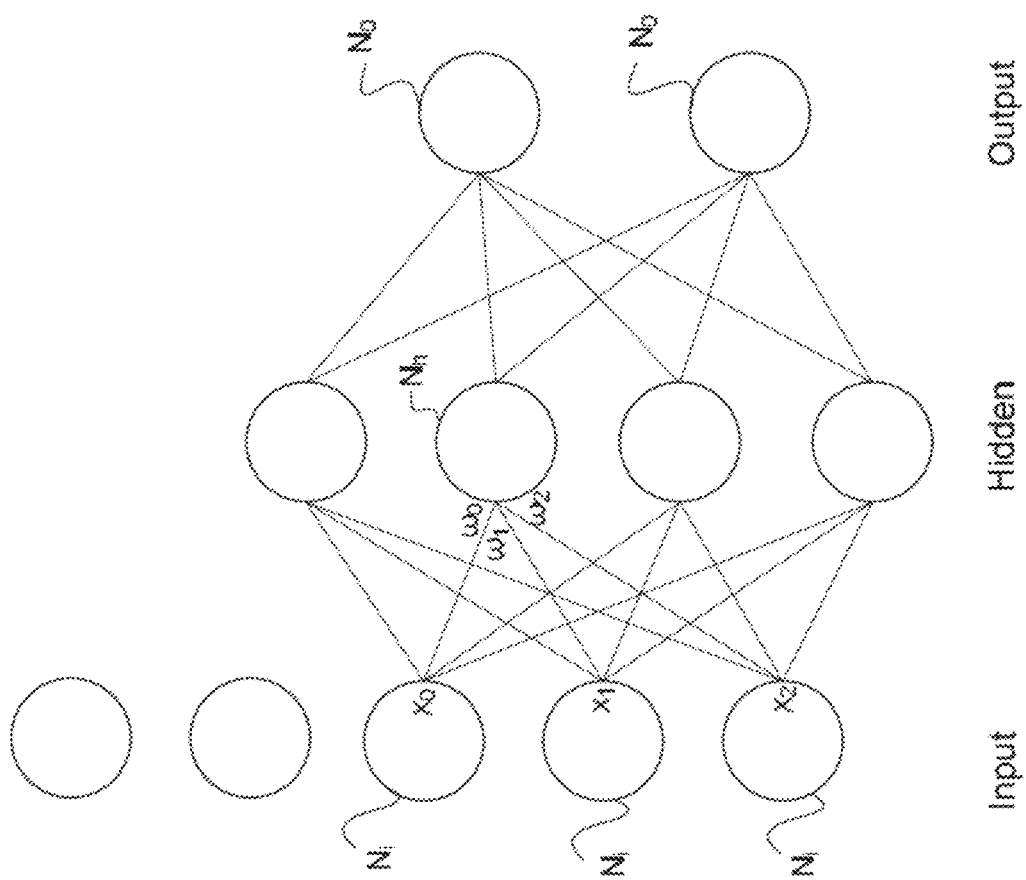
FIG. 1 is a highly simplified schematic view of a neural net.
Figure 1A:
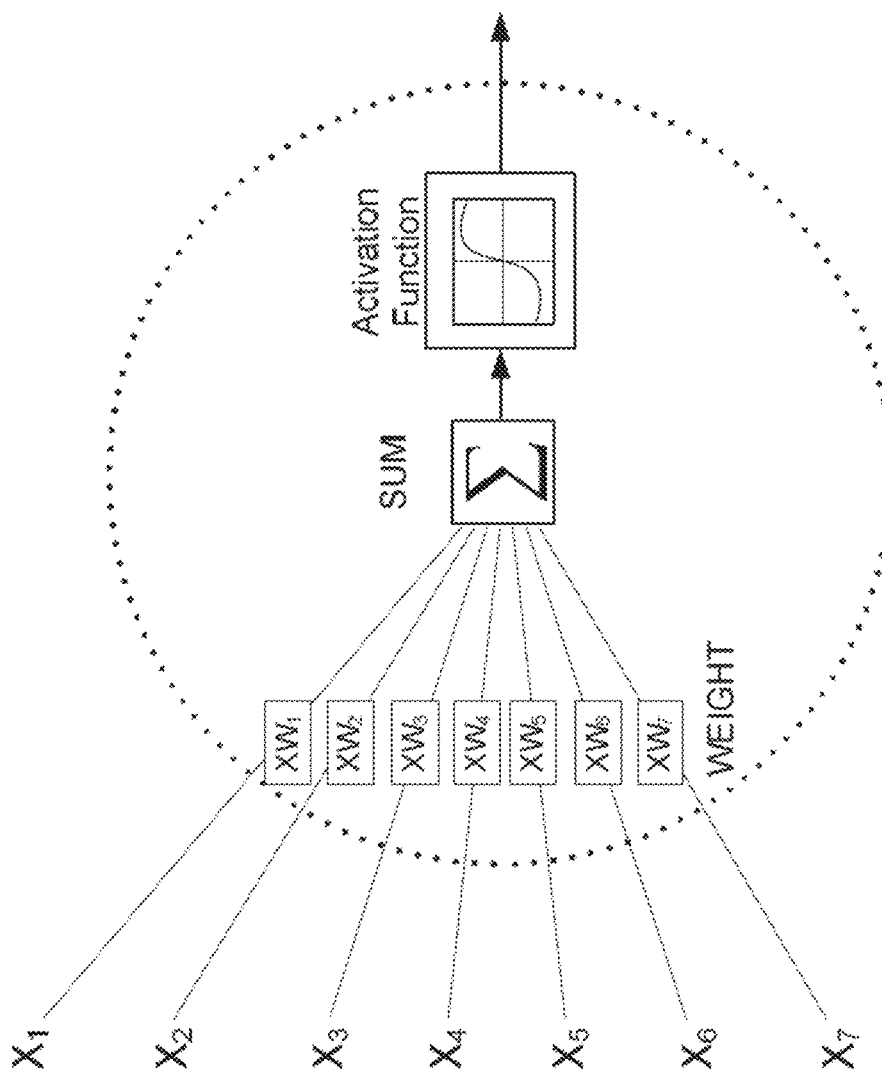
FIG. 1A is a highly simplified schematic view of a neuron.
Figure 2:
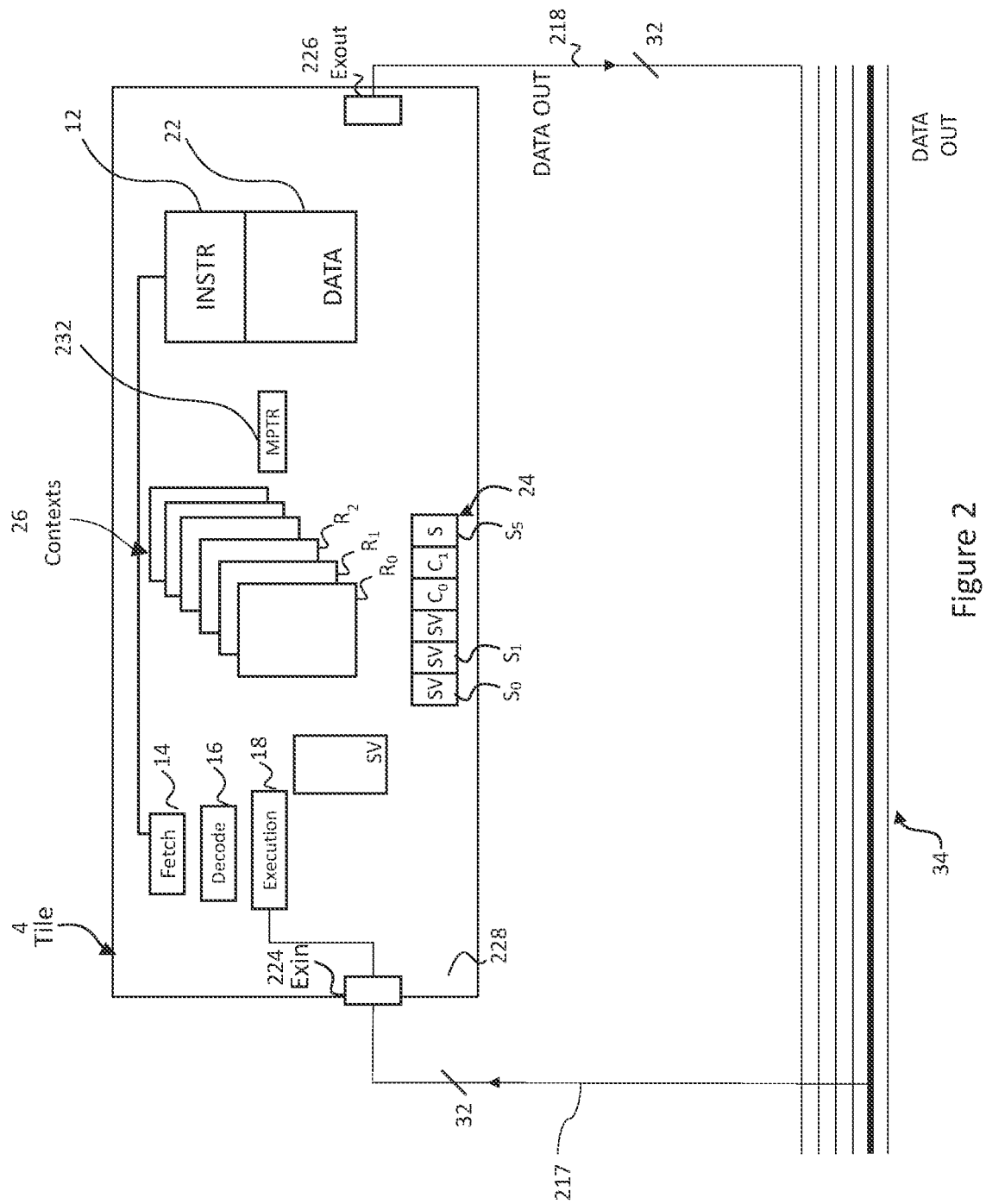
FIG. 2 illustrates a processing unit including an execution unit usable in embodiments of the present invention.

FIG. 2 illustrates an example tile 4 in accordance with embodiments of the present disclosure. In the tile 4, multiple threads are interleaved through a single execution pipeline. Data is received at the tile via an exin interface 224, and transmitted from the tile via an exout interface 226. The tile 4 comprises: a plurality of contexts 26 each arranged to represent the state of a different respective one of a plurality of threads; a shared instruction memory 12 common to the plurality of threads; a shared data memory 22 that is also common to the plurality of threads; a shared execution pipeline 14, 16, 18 that is again common to the plurality of threads; and a thread scheduler 24 for scheduling the plurality of threads for execution through the shared pipeline in an interleaved manner. The thread scheduler 24 is schematically represented in the diagram by sequence of time slots $S_0 \ldots S_5$, but in practice is a hardware mechanism managing program counters of the threads in relation to their time slots. The execution pipeline comprises a fetch stage 14, a decode stage 16, and an execution stage 18 comprising an execution unit (EXU) and a load/store unit (LSU). Each of the contexts 26 comprises a respective set of registers $R_0$, $R_1 \ldots$ for representing the program state of the respective thread.

The fetch stage 14 is connected to fetch instructions to be executed from the instruction memory 12, under control of the thread scheduler 24. The thread scheduler 24 is configured to control the fetch stage 14 to fetch instructions from the local program for execution in each time slot as will be discussed in more detail below.

The fetch stage 14 has access to a program counter (PC) of each of the threads that is currently allocated to a time slot. For a given thread, the fetch stage 14 fetches the next instruction of that thread from the next address in the instruction memory 12 as indicated by the thread's program counter. Note that an instruction as referred to herein, means a machine code instruction, i.e. an instance of one of the fundamental instructions of the computer's instruction set, made up of an opcode and zero or more operands. Note too that the program loaded into each tile is determined by a processor or compiler to allocate work based on the graph of the machine intelligence model being supported. Note that the operand may be given in an operand field in the instruction, or may be accessed by a memory address or register identifier at which the operand is stored. In a further example, the operand may be implicitly defined by the instructions (for example held in an implicitly defined register).

The fetch stage 14 then passes the fetched instruction to the decode stage 16 to be decoded, and the decode stage 16 then passes an indication of the decoded instruction to the execution stage 18 along with the decoded addresses of any operand registers of the current context specified in the instruction, in order for the instruction to be executed.

In the present example, the thread scheduler 24 interleaves threads according to a round-robin scheme whereby, within each round of the scheme, the round is divided into a sequence of time slots $S_0$, $S_1$, $S_2$, $S_3$, each for executing a respective thread. Typically each slot is one processor cycle long and the different slots are evenly sized (though not necessarily so in all possible embodiments). This pattern then repeats, each round comprising a respective instance of each of the time slots (in embodiments in the same order each time, though again not necessarily so in all possible embodiments). Note therefore that a time slot as referred to herein means the repeating allocated place in the sequence, not a particular instance of the time slot in a given repetition of the sequence. In the illustrated embodiment, there are eight time slots, but other numbers are possible. Each time slot is associated with hardware resource, e.g. register, for managing the context of an executing thread.

One of the contexts 26, labelled SV, is reserved for a special function, to represent the state of a "supervisor" (SV) whose job it is to coordinate the execution of "worker" threads. The supervisor can be implemented as a program organised as one or more supervisor threads which may run concurrently.

Each worker thread is a codelet intended to represent a vertex in the graph and to execute atomically. That is all the data it consumes is available at launch and all the data it produces is not visible to other threads until it exits. It runs to completion (excepting error conditions).

During execution, the worker threads may require different types of functions, such as logarithms or exponentials, to be evaluated. One known algorithm that is frequently used to evaluate hyperbolic and trigonometric functions is the CORDIC algorithm. The CORDIC algorithm utilises a series of shift and add operations to determine values for functions. Such shift and add algorithms may be applied to evaluate logarithms and exponentials. The shift and add operations may be implemented in an execution module which comprises shifters and adders.

One of the disadvantages of the use of such shift and add algorithms can be the linear convergence provided by such algorithms. For example, CORDIC converges linearly to the value of a function by determining a set number of bits every iteration. This may require a larger number of iterations in the case that the precision level of the numerical values is high.

Embodiments of the application address one or more of these issues by providing an execution unit as a hardware module comprising a processing pipeline. The processing pipeline comprises a set of multipliers that may be used in different configurations to perform multiplications so as to evaluate different functions. The processing pipeline comprises a plurality of state elements placed between the multipliers, to store state values at the input of each pipeline stage. The state elements are in some cases associated with multiplexers to alter the connections between pipeline stages. The hardware module comprises control circuitry that is configured to control the multiplexers so as to determine the function evaluated using the processing pipeline. The hardware module may be used in conjunction with innovative function evaluation techniques to carry out a number of different functions in a single structure. In the present disclosure, it is used to determine an exponential function.

Figure 3:
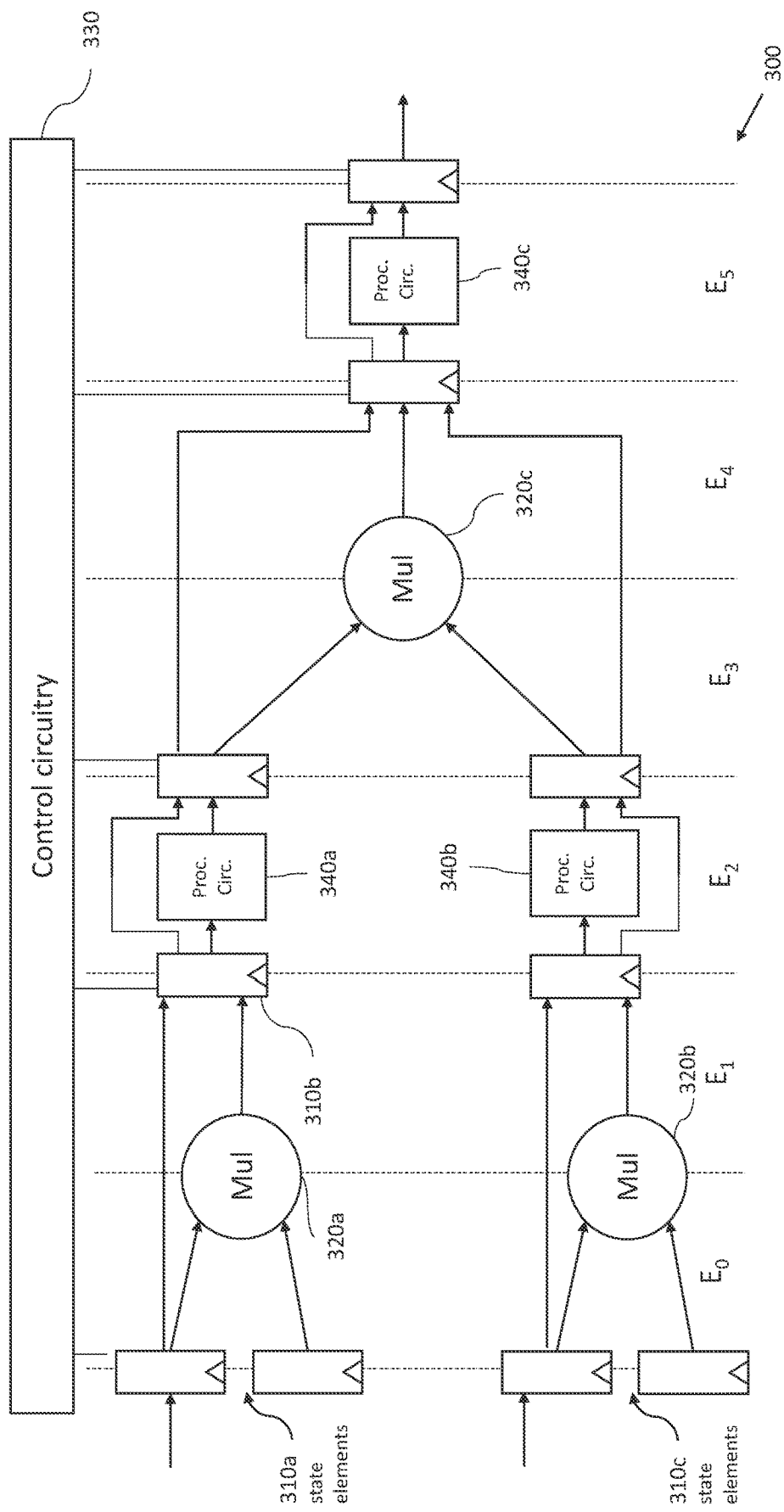
FIG. 3 shows a schematic view of an execution pipeline.

Reference is made to FIG. 3, which illustrates an example of a processing pipeline 300 according to examples of the application. A shown, the pipeline is divided into a plurality of stages $E_0 \ldots E_5$.

The processing pipeline 300 comprises a plurality of multipliers 320a, 320b, 320c, each of which is configured to multiply together two input values and to provide an output value. Each of the multipliers in this example carries out its processing over two stages of the processing pipeline. For example, multipliers 320a and 320b perform their processing during stages $E_0$ and $E_1$ of the processing pipeline 300. Therefore, these multipliers 320a and 320b operate in parallel. Multiplier 320c, on the other hand, performs its processing during stages $E_3$ and $E_4$ of the pipeline. Multiplier 320c, therefore, operates in series with the other two multipliers.

The pipeline 300 may also contain additional processing circuitry 340a, 340b, and 340c. This additional processing circuitry may be applied to perform a number of different operations, such as shifts and adds, on the results from the multipliers. The results of the first multiplier 320a may be processed by additional processing circuitry 340a. The results of the second multiplier 320b may be processed by additional processing circuitry 340b. The result of the third multiplier 320c may be processed by additional processing circuitry 310c.

The pipeline 300 comprises a plurality of state elements (such as flip-flops) 310a, separating the stages of processing. The state elements are in some cases associated with multiplexers which control where the values resulting from each stage of processing are directed to during the next stage. The hardware module comprises control circuitry 330 for controlling the multiplexers. By controlling the multiplexers, the control circuitry is used to select a function to be calculated by the processing pipeline. A plurality of different types of functions may be evaluated using the processing pipeline 300 by controlling where the outputs at each stages are directed during the next stage. For example, input multiplexers at the state elements (e.g., elements 310a, 310b, and 310c) are able to direct one or more received values such that they bypass the multiplier 320a during the stages $E_0$ and $E_1$ or such that they are delivered to the multiplier 320a for processing during the stages $E_0$ and $E_1$. Similarly, the multiplexer at input state element 310b is able to direct one or more received values such that they bypass the additional processing circuitry 340a during the stage $E_2$ or such that they are processed by the additional processing circuitry 340a during the stage $E_2$. The multiplexor at state element 310b may be configured to direct the packets to specific inputs of the additional processing circuitry 340a so as to select functions, e.g. addition, shift, to be performed by the additional processing circuitry 340a.

Figure 4:
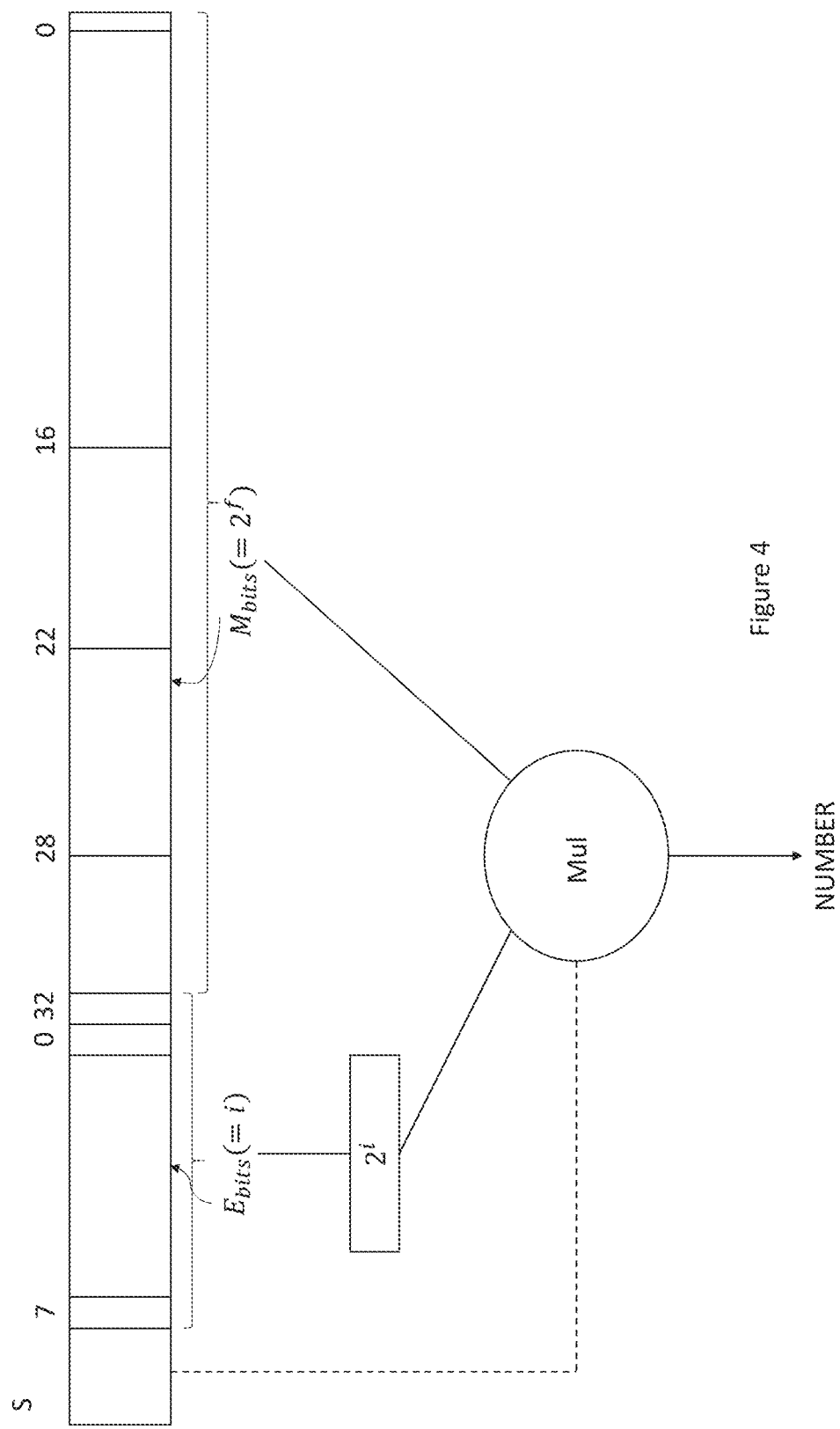
FIG. 4 is a schema illustrating floating point formats.

The processing pipeline 300 may be applied for evaluating various different functions, for example logarithmic functions and exponential functions. Examples will now be described of the use of such a pipeline 300 or similar variations of such a pipeline for evaluating exponential functions. The aim is to provide a result in floating point format of $e^x$, where x is an input value. The first step in using the multiplier configuration of FIG. 3 to evaluate the exponential function is to recognise certain properties of the floating point format, and its relationship to certain mathematical properties of exponential functions. Looking at FIG. 4, this represents a set of bits representing a number in the FP32 format, but with an expanded mantissa. The normal mantissa length is 23 bits in FP32 format, but increasing the length of the mantissa to 33 bits gives better accuracy. The inventors have determined empirically that a mantissa length of 33 bits is a good trade off between complexity and accuracy when calculating an exponential function. Bit S is the single sign bit. E bits represent the exponential bits which denote an integer value. The M bits denote bits of the expanded mantissa. As explained already, there is a single sign bit and 8 exponential bits. The length of the mantissa is extended by multiplying the FP32 format mantissa (23 bits) by a 33 bit value for $\log_2(e)$.

In floating point format, the exponent bits are used as described in the background section. That is, when the number 2 is raised to the power of the exponent bits (minus the offset), and multiplied by the mantissa value then the number which is represented by the floating point format representation is given. By reorganising the exponential function such that it can be re-written as the product of two powers of two, it is possible to treat an integer part and a fractional part separately. This can be derived as shown:

$$e^x = e^{x.ln(2).\log 2(e)} \qquad \text{Eqn 1}$$

$$e^x = e^{(i+f)ln(2)} \qquad \text{Eqn 2}$$

where $(i+f)=x.\log_2(e)$. i is an integer and f a fractional part $$e^x = e^{i.ln(2)} \cdot e^{f.ln(2)} \qquad \text{Eqn 3}$$

$$e^x = 2^i \cdot 2^f \qquad \text{Eqn 4}$$

Similarly, for base-2 exponentials ($2^x$), the following formula can be used to convert them: $2^x = e^{x.ln2}$, such that they can similarly be approximated by the following techniques. Reverting to Eqn. 1, the constant $\log_2(e)$ is used to pre-multiply the exponential with natural log, ln(2), so that the result can be split into two separate numbers, one which can represent the integer part and one which can represent the fractional part. The integer part i then forms the exponent of the result, and the fractional part may be split as will now be described.

Returning to the FP format representation, the final value is given by $2^{[exp]} \times M$. Therefore, i represents the exponent in the floating point value. Thus, the exponent bits in the floating point representation of the exponential result are the binary representation of i. Therefore, it is not necessary to evaluate $2^i$ any further. The mantissa bits represent $2^f$, which must be evaluated.

To evaluate $2^f$, the f can be split into sub-components:

$$f = f_0 + f_1 + f_2 + f_3$$

Therefore, $2^f$ may be written as:

$$2^f = 2^{f_0} \cdot 2^{f_1} \cdot 2^{f_2} \cdot 2^{f_3}$$

Each of the separate components $f_0 \ldots f_3$ represents a bit slice of f. For example, for the following example value of f (by way of example only where f is 8 bits long), the respective components are indicated:

f=11111111
$f_0$=11000000
$f_1$=00110000
$f_2$=00001100
$f_3$=00000011

A look up table or estimation is used to evaluate the separate components of $2^f$. In the above example, bit slices are each of the same length. However, the inventors have recognised that it can be particularly efficient to cause the bit slices to be of varying length, such that they can be handled by look up tables or estimation, depending on their significance What is needed is to generate an accurate value for $2^f$ for each component f.

An exponential can be represented as a Taylor Series as follows:

$$e^x = \frac{1+x}{1!} + \frac{x^2}{2!} + \frac{x^3}{3!} + \ldots$$

Therefore, $2^f$ can be estimated as:

$$2^f = 1 + \frac{f\ln 2}{1!} + \frac{(f\ln 2)^2}{2!} + \ldots$$

The series are infinite, but it will readily be appreciated for small values of x or f the later components rapidly become vanishingly small.

The aim is to select a length of each bit slice such that look up tables can be efficiently stored and accessed, and conversely that if a slice is estimated, it can be done without loss of accuracy.

One aim therefore is to keep the highest order bit slice to be short, such that the look up table may contain a smaller number of entries, although each entry may be longer. Note that the length of an entry is governed amongst other things by the number of bits of precision that is used. In this case, 33 bits precision is utilised, so each entry in the look up table for the most significant bit slice constitutes 33 bits. If the length of the most significant bit slice is 4, as in the present example, the number of entries in the look up table is $2^4$ (16), and each entry has a length of 33 bits.

Note that for the next order bit slice, there is no need to store values for the bits preceding it in the mantissa. That is, the bits which correspond to the most significant bit slice would all be zeroes when considering the next order bit slice. Thus, the length of entries in the look up table for the next order bit slice is 33−4=29. If the second order bit slice is 5 bits long as in the present example, the number of entries is $2^5$, that is 32. Similarly, for the following next order bit slice, there is no need to store the leading zeroes and so the number of bits in each entry is 33−9 (24). If the number of bits in the bit slice is 7, the number of entries in the look up table is $2^7$ (128). Thus, by varying the length of the bit slices in this way, the look up tables can be sized to select the number of entries and the length of the entries in the most appropriate way.

Note that the above numbers are exemplary only, other arrangements are possible, and it is also possible that two or more of the leading order bit slices have the same length. Also note that in the described example the tables store fractional values $1.0 \leq t \leq 2.0$. The "1! is implicit and is not stored, although it is required for subsequent calculations.

When considering the least significant bits slice, based on 33 bit precision, the 17 bits of this bit slice represent a value which when expanded by the Taylor series would be such that any terms beyond the first order would exceed the precision length. It is therefore possible to calculate this term in the first order (1+fln2) rather than utilising a look up table and still achieve the necessary accuracy parameters. The length of the least significant bit slice may be half the total length of the expanded mantissa (e.g. 16 or 17 bits long)—its length is governed by the extent to which its estimate 1+fln2 is accurate within the given precision.

Figure 5B:
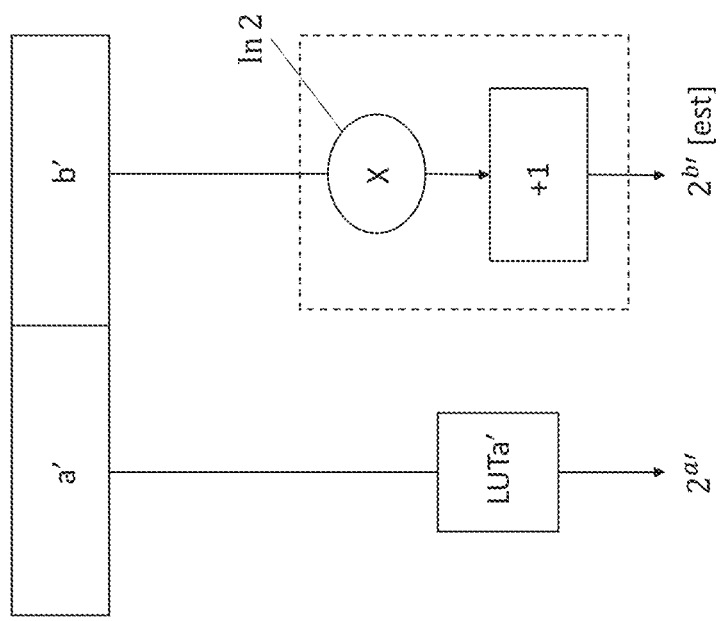
FIG. 5B is a schematic diagram illustrating the formation of a mantissa in half precision format.
Figure 5A:
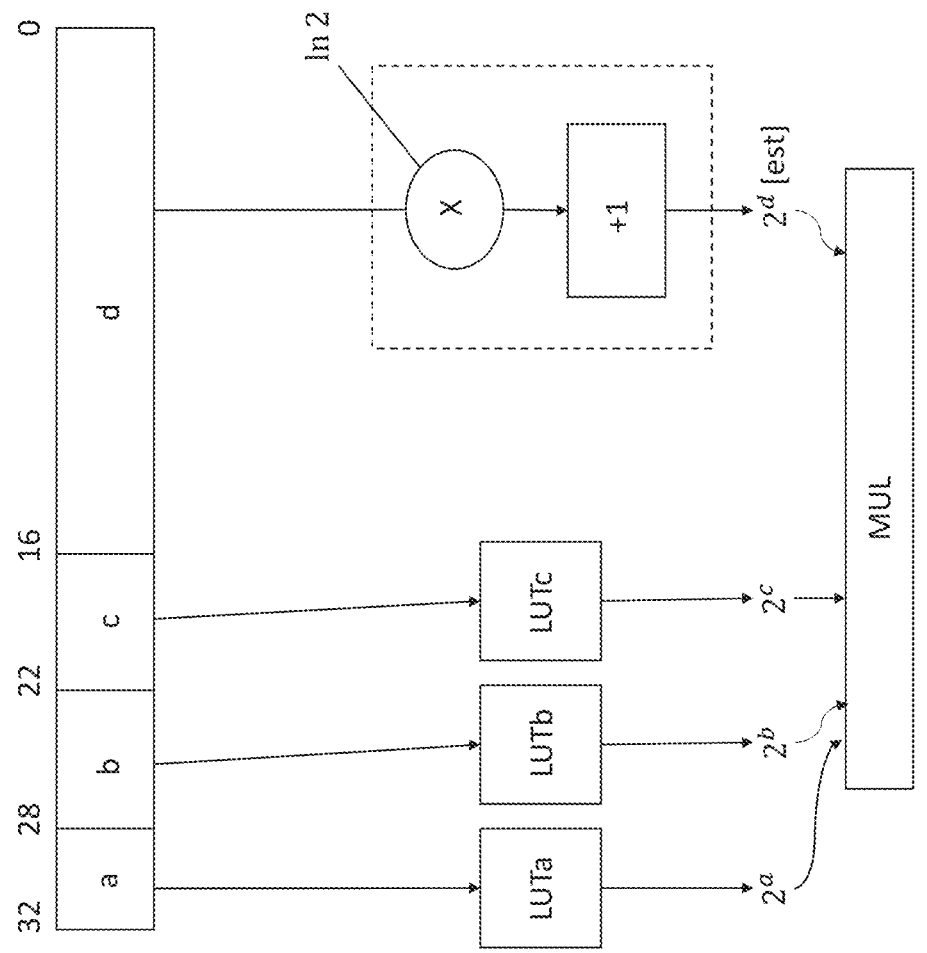
FIG. 5A is schematic diagram illustrating the formation of a mantissa in single precision format.

FIG. 5A shows four bit slices of the expanded mantissa $M_x$[FP32] in one example, labelled as follows:

a—bits 29 to 32
b—bits 23 to 28
c—bits 17 to 22
d—bits 0 to 16

Three of these may be used to access a respective look up table as shown in FIG. 5A. Look up tables are labelled LUTa, LUTb and LUTc as associated with their input bit slices a, b, c respectively. In one example, look up table LUTa has 16 entries, LUTb has 32 entries and LUTc has 128 entries each. As explained above, each entry is a value which is $2^y$, where y represents the value of the bit slice fed to that look up table.

The least significant component ($f_c$) is calculated as:

$$2^{f_c} = 1 + f_c \cdot \ln(2) \qquad \text{Eqn 7}$$

The look up tables may be used to evaluate all but the smallest of the components (i.e. $f_3$ in the above example). $f_3$ may then be determined using Equation 7 as shown above.

The separate components are then multiplied together using the processing pipeline according to embodiments of the application to obtain a value for $2^f$. Therefore, a mantissa value $2^f$ is obtained for the exponential result ($e^x$) of input value x in addition to the exponent.

Figure 6:
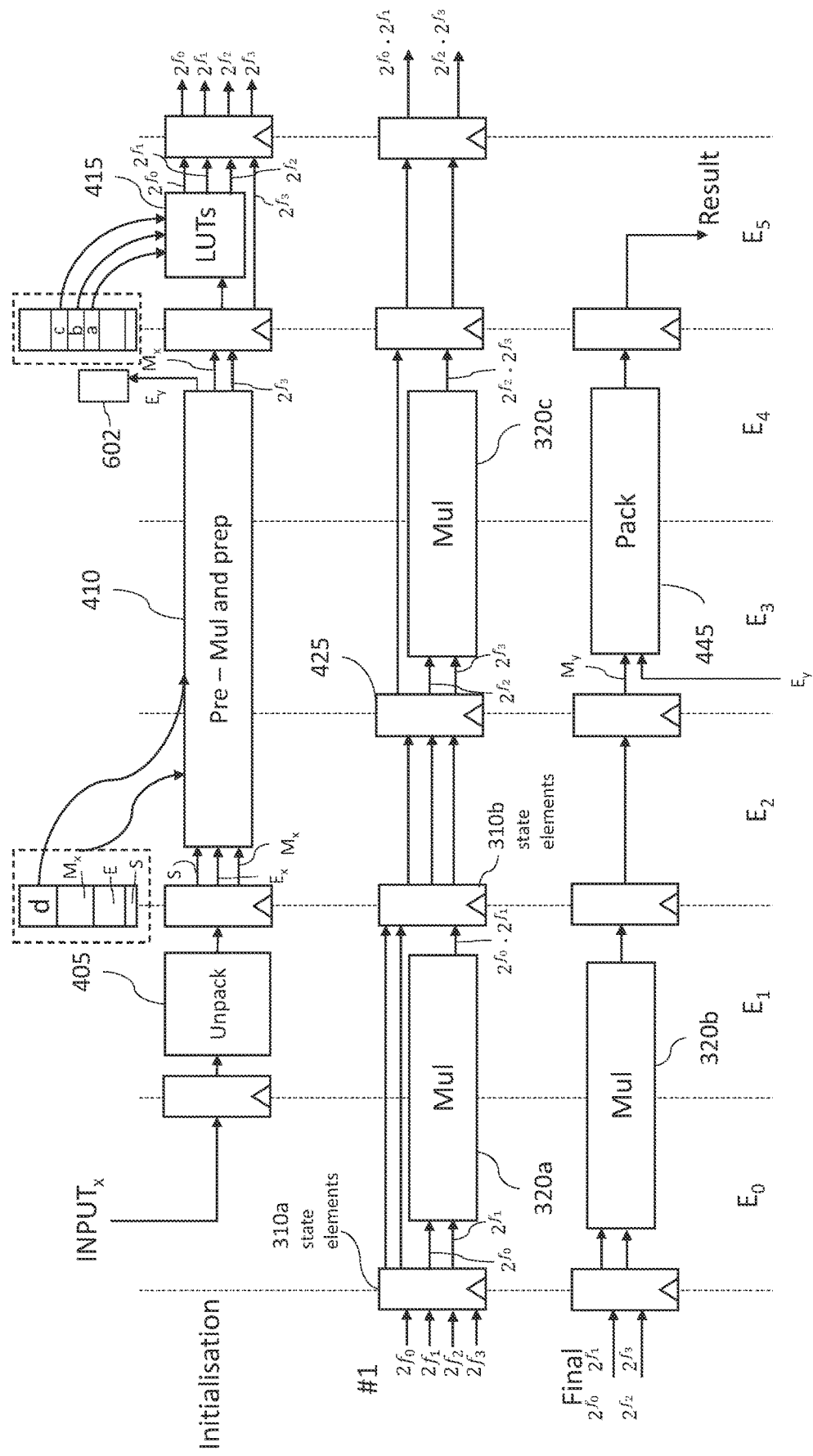
FIG. 6 is a schematic diagram showing different stages of operation of the pipeline to generate an exponential result in single precision format.

Reference is made to FIG. 6, which illustrates the use of a processing pipeline according to embodiments of the application for evaluating an exponential function. This example may be used for evaluating an exponential function of a single-precision floating point number.

The input number is extracted from a computer instruction which has an opcode defining the exponential function and an operand which is, or points to, the input number. The hardware module is configured to provide the number to the processing pipeline just prior to the second stage $E_1$ of processing. Therefore, the number skips a first stage of processing during an initialisation run through the pipeline. During the initialisation run through of the pipeline, the number is delivered first to unpack circuitry 405, which is configured to unpack the exponent Ex, mantissa Mx, and sign bit Sx from the input floating point number x. The unpacked parts of the number are then delivered to a pre-multiplier and preparation circuitry 410. The pre-multiplier and preparation circuitry 410 determines from the number an integer part and a fractional part. That is, the pre-multiplier and preparation circuit determines x. $\log_2 e$ to generate i+f, and then determines i as the largest integer leaving only f, the fractional component. The binary representation of i forms the exponent Ey of the result value, which is stored in a register 602 until the final pass of the pipeline. The fractional part must be evaluated, as discussed above, in order to determine the mantissa of the result. The pre-mul and prep circuitry 410 may also evaluate the least significant component $2^{f_3}$ of the fractional part using Equation 7 as shown above, from bits 0 to 16 of the expanded mantissa.

In order to evaluate the fractional part, the bit slices a, b, c are passed to at least one look up tables LUTa, b, c in block 415. The hardware module is configured to access from the look up tables 415, the entry for each of the plurality of components $2^{f_0}$, $2^{f_1}$, $2^{f_2}$ of the fractional part.

The different evaluated components (i.e. $2^{f_c}$ are held in a register, ready to be further processed by the pipeline.

The different evaluated components of the fractional part are then processed together using the processing pipeline of multipliers. In this example, the multipliers are applied in series only and multiplication takes place over two runs through the pipeline. However, in other examples, two or more of the multipliers may be arranged in parallel (as illustrated in the example of FIG. 3) so as to perform the multiplications of different components of the fractional part in parallel.

As shown, at the pipeline pass #1 of the pipeline, two of the evaluated components $2^{f_0}$, $2^{f_1}$ are provided to the multiplier 320a, which is configured to multiply these two components together and to output the result of the multiplication. The pipeline multiplexers are controlled to cause the result of the multiplication at multiplier 320a to bypass multiplier 320c and be delivered onwards to the end of the pipeline.

The other two evaluated components $2^{f_2}$, $2^{f_3}$ are switched to bypass multiplier 320a and to arrive at latch 425. These components are input to multiplier 320c, which multiplies these two components together and outputs the results of the multiplication. The results from the two multiplications during the pipeline pass #1 are then stored in a register ready for a final run through the pipeline.

The results from the multiplications performed by multipliers 320a and 320c are passed to multiplier 320b, which is configured to multiply together these two results to obtain a mantissa My for the output value for the exponential function. The mantissa is then provided to a packing circuit 445. The packing circuit 445 is configured to take the mantissa My resulting from the multiplication at multiplier 320b and pack it with the exponent Ey determined by the pre-multiplier and prep circuit 410 to determine a floating point representation for the exponential result ($e^x$).

Although the present example describes splitting the fractional part into four components (four bit slices of the input mantissa), it will be appreciated that other numbers of components may be used. A larger number of components requires a greater number of multiplications to be carried out, but reduces the necessary size of the look up table/s. A smaller number of components requires larger look up tables, but reduces the number of multiplications that must be carried. There exists a trade off between these considerations. Moreover, at least some of the bit slices may have differing lengths, which enables a further optimisation of the trade-off between the size of the look up tables and the number of multiplications, without compromising on accuracy.

Figure 7:
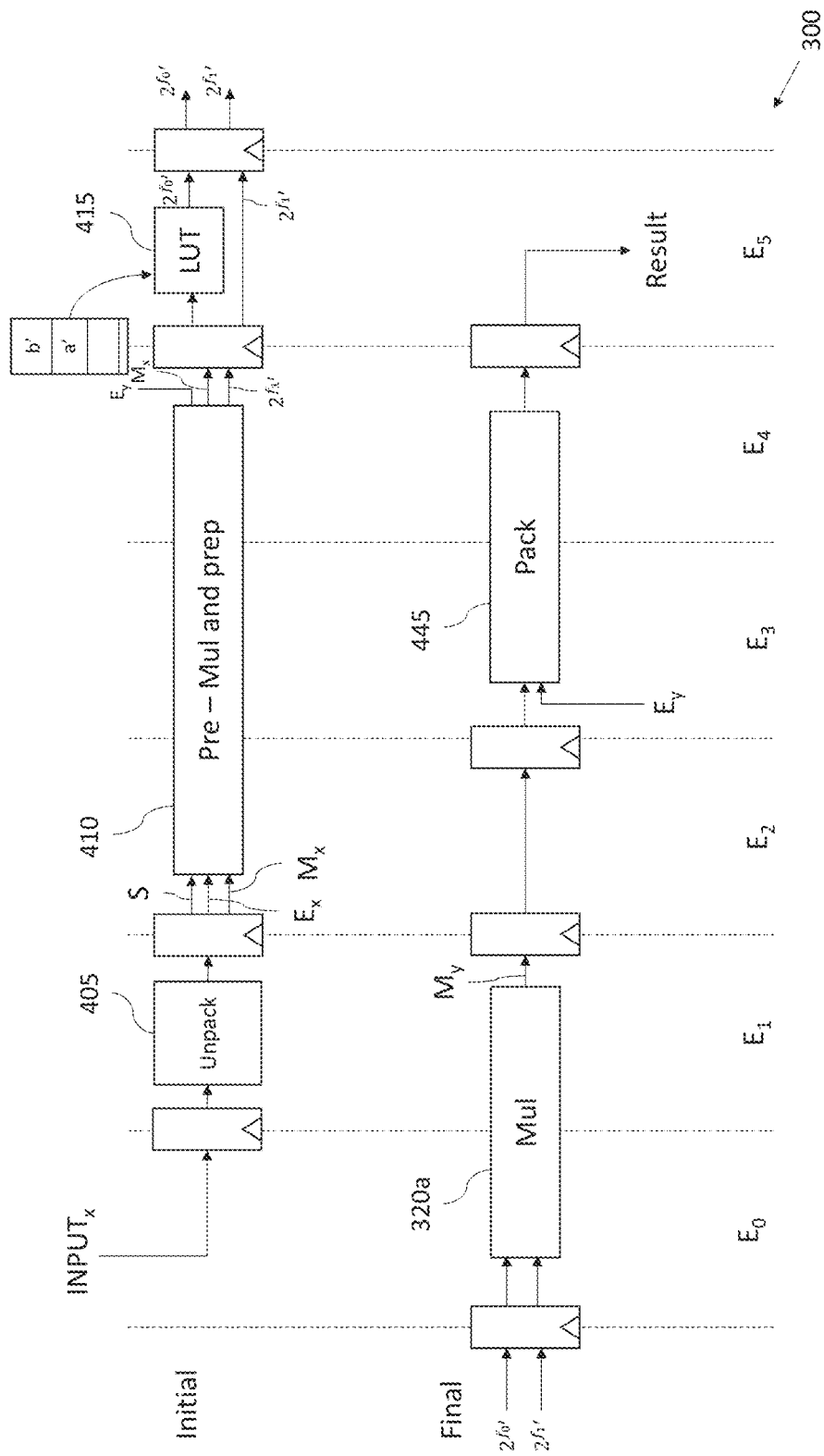
FIG. 7 is a schematic diagram illustrating stages in execution of a pipeline to generate an exponential result in half precision format.

Reference is made to FIG. 7, which illustrates the use of a processing pipeline according to embodiments of the application for evaluating an exponential function of a half-precision floating point number.

The input x is extracted by the hardware module (from the instruction itself or from memory or a register). The hardware module is configured to provide the number to the processing pipeline just prior to the second stage $E_1$ of processing. Therefore, the number skips a first stage of processing during the initialisation run through the pipeline. During the initialisation run through of the pipeline, the number is delivered first to the unpack circuitry 405, which is configured to unpack the exponent Ex, mantissa Mx, and sign bit Sx from the input floating point number. The number is then delivered to pre-multiplier and preparation circuity 410. The pre-multiplier and the preparation circuitry 410 determines from the number an integer part (corresponding to the exponent of the result Ey, as discussed above) and a fractional part. The fractional part must be evaluated, as discussed above, in order to determine the mantissa of the result. The pre-multiplier and prep circuitry 410 may evaluate one or more components of the fractional part using Equation 7 as shown above.

In order to evaluate the fractional part, the fractional component a' is passed to a look up table in block 415. The hardware module is configured to access from the look up table 415, the entry for component a' of the fractional part. In the case of a half-precision floating point number, the fractional part may be divided into only two components, corresponding to two bit slices a', b' of the mantissa Mx. The look up table LUT a' may be used to evaluate only one of these components $2^{f_{0'}}$, with the remaining component $2^{f_{1'}}$ being evaluated using Equation 7 given above. FIG. 5B shows operation to generate the fractional components in half precision floating point. Note that the mantissa has been extended to a greater number of bits than normal FP16 precision (in this case 23 bits). This can be achieved by using a value for $\log_2(e)$ of a suitable length (e.g. 23 bits), as in the case of the FP32 example.

The evaluated components (i.e. $2^{f_c}$) are shared in a register, ready to be further processed by the pipeline.

In this example, there are only two evaluated components and so only a single multiplier 320a is used to multiply these components together to produce the mantissa My of the function result. The mantissa is then provided to the packing circuit 445. The packing circuit 445 is configured to take the mantissa resulting from the multiplication at multiplier 320a and pack it with the exponent Ey determined by the pre-mul and prep circuit 410 to determine a floating point result for the mantissa.

It will be appreciated that the embodiments described are by way of non-limiting examples only, and that variations within the scope of the claims may be envisaged. In one variation, while the examples have been given in the context of floating point numbers of single precision and half precision formats, the technique may readily be adapted to floating point formats of different precisions.

What is claimed is:

1. An execution unit for a processor, the execution unit comprising:

at least one multiplier circuit having first and second inputs, and configured to perform a multiplication operation;

control circuitry configured to supply an operand as a first input value at the first input and a fixed multiplicand, $\log 2(e)$, as a second input value at the second input and to extract an integer part and a fractional part from a first multiplication result of the multiplication operation, the operand being a number in floating point format;

an exponent register for storing the integer part as an exponent of the first multiplication result;

a look up table having a plurality of entries each of which are accessible by a bit sequence representing a fractional part f to provide a corresponding value of $2^f$;

a preparatory circuit configured to extract at least first and second bit sequences from a mantissa of the operand, to generate an estimated fractional component from the first bit sequence, and to use the second bit sequence to access a value from the look up table;

the control circuitry further configured to supply the $2^f$ value at the first input of the at least one multiplier circuit and the estimated fractional component at the second input of the at least one multiplier circuit to generate a second multiplication result which constitutes the mantissa of an exponential of the operand.

2. An execution unit according to claim 1, wherein the floating point format is half precision and wherein only first and second bit sequences are extracted from the mantissa of the operand.

3. An execution unit according to claim 1, wherein the floating point format is single precision, and wherein more than first and second bit sequences are extracted from the mantissa of the operand.

4. An execution unit according to claim 3, wherein four bit sequences are extracted from the mantissa of the operand.

5. An execution unit according to claim 1, wherein the first and second bit sequences are of different lengths.

6. An execution unit according to claim 3, comprising a plurality of look up tables, each look up table configured to be accessed by a respective bit sequence, wherein the number of entries in each look up table depends on an order of significance of the respective bit sequence in the mantissa.

7. An execution unit according to claim 1, comprising three multiplier circuits wherein first and second of the three multiplier circuits are configured to execute a multiplication in the same stage of a pipeline, and wherein a third of the three multiplier circuits is arranged to execute a multiplication in a subsequent stage of the pipeline.

8. An execution unit according to claim 1, wherein the mantissa of the exponential is an extended mantissa relative to a mantissa length in a half precision or single precision format.

9. An execution unit according to claim 1, comprising a circuit for extracting the mantissa from the input floating point number and a packing circuit for combining the mantissa of the exponential with the exponent of the exponential.

10. An execution unit according to claim 1, wherein the preparatory circuit is configured to generate an estimate of the estimated fractional component from the first bit sequence by multiplying the first bit sequence by ln2 to generate a third multiplication result and incrementing the third multiplication result by 1.

11. A method of operating an execution unit in a processor, the method comprising:

supplying to at least one multiplier circuit of the execution unit an operand defined by an instruction and a fixed multiplicand log $2(e)$ to generate a first multiplication result, the operand being a number in floating point format;

extracting an integer part and a fractional part from the first multiplication result;

storing the integer part in an exponent register;

extracting at least first and second bit sequences from a mantissa of the operand;

generating an estimated fractional component from at least the first bit sequence; and supplying at least the second bit sequence to a look up table having a plurality of entries each of which are accessible by a bit sequence representing a fractional component f and providing a value of $2^f$; and supplying the accessed $2^f$ value as a first input value to the at least one multiplier circuit, and the estimated fractional component as a second input value to the at least one multiplier circuit and generating a second multiplication result representing the mantissa of the exponential of the operand, wherein the integer part represents the exponent of the exponential.

12. A method according to claim 11, wherein the floating point format is half precision and the step of extracting at least first and second bit sequences from the mantissa of the operand comprises extracting only first and second bit sequences from the operand.

13. A method according to claim 11 wherein the floating point format is single precision and wherein the step of extracting at least first and second bit sequences from the mantissa of the operand comprises extracting more than first and second bit sequences.

14. A method according to claim 13 comprising the step of extracting four bit sequences from the mantissa of the operand.

15. A method according to claim 11, wherein the at least first and second bit sequences are of different lengths.

16. A method according to claim 15, wherein the second bit sequence is longer than the first bit sequence.

17. A method according to claim 11, comprising the step of multiplying the number in floating point format by a fixed value having an extended mantissa length relative to a mantissa length in the half precision or single precision format.

18. A method according to claim 11, wherein the step of generating the estimated fractional component comprises multiplying the first bit sequence by ln 2 to generate a third multiplication result and incrementing the third multiplication result by 1.

* * * * *